United States Patent [19]

Laing et al.

[11] Patent Number: 4,873,828
[45] Date of Patent: Oct. 17, 1989

[54] ENERGY STORAGE FOR OFF PEAK ELECTRICITY

[76] Inventors: Oliver Laing; Johannes L. N. Laing, both of 4461 Ocean Blvd., Apt. 54, San Diego, Calif. 92019

[21] Appl. No.: 846,338

[22] Filed: Mar. 31, 1986

Related U.S. Application Data

[63] Continuation-in-part of Ser. No. 611,464, May 17, 1984, Pat. No. 4,710,100.

[30] Foreign Application Priority Data

Nov. 21, 1983 [CH] Switzerland .......................... 6242/83

[51] Int. Cl.⁴ .............................................. F01K 27/00
[52] U.S. Cl. ....................................... 60/659; 60/652; 60/682; 114/256; 405/210
[58] Field of Search ................. 60/650, 652, 659, 682, 60/398; 114/256, 257; 405/210, 224

[56] References Cited

U.S. PATENT DOCUMENTS

| | | | |
|---|---|---|---|
| 2,487,786 | 11/1949 | Bogle | 114/257 |
| 4,523,432 | 6/1985 | Frutschi | 60/659 |
| 4,526,005 | 7/1985 | Laing et al. | 60/659 |

FOREIGN PATENT DOCUMENTS

| | | | |
|---|---|---|---|
| 25384 | 3/1981 | European Pat. Off. | 114/257 |
| 3206934 | 9/1983 | Fed. Rep. of Germany | 60/659 |
| 148626 | 11/1981 | Japan | 60/659 |

Primary Examiner—Stephen F. Husar

[57] ABSTRACT

A method and apparatus for storing excess electricity generated during off-peak periods. The electricity is used to run compressors which compress the air in a plurality of stages. The air is cooled after each stage to remove the heat of enthalpy. The air is stored in bags on the bottom of the sea. To recover the energy, the compressed air is run through turbines and the heat removed during compression is reintroduced.

2 Claims, 5 Drawing Sheets

ENERGY STORAGE FOR OFF PEAK ELECTRICITY

This application is a continuation-in-part of application Ser. No. 06/611,464 filed May 17, 1984, now U.S. Pat. No. 4,710,100.

The invention is concerned with a storage system for electric energy. The storage of off-peak electric energy can be accomplished with batteries, pump-storage reservoirs, and plants with underground caverns for compressed air storage.

Pump-storage power generation is dependent on large elevation differences and on reservoir beds capable of storing sufficient amounts of water. The number of such suitable sites in the United States is limited. Similarly, underground caverns for compressed-air storage required huge natural or excavated cavities in hard rock or salt domes. Furthermore, most of the enthalpy of compression is lost in existing compressed-air storage designs, resulting in a low storage efficiency.

The invention relates to an electric energy storage system that uses compressed air as the principal storage medium; however, the enthalpy of compression is withdrawn and the highly compressed old air is fed into storage vessels that are anchored to the ocean floor, preferably as deeply as possible. These vessels are made from reinforced plastic foil. A further feature of the invention is the conservation of the compression enthalpy by storing the heat in a heat storage tank. This extraction of heat occurs after each compression stage of a multistage compressor. In this manner, nearly the total input energy (minus mechanical and thermal losses) can be recovered when the stored heat is returned in successive stages to the expanding compressed air. This system enables economical and efficient storage of large amounts of energy. The invention utilizes a compressor with many compression stages in order to minimize the thermodynamic losses associated with entropy increase. Each stage's degree of compression is designed to produce a temperature rise suitable for heat storage in water. The air stream flows through the compressor stages in series. Heat is removed between stages in heat exchangers by the heat-storage water.

The temperature rise of the air stream is designed to be the same within each stage. For this reason, the heat storage water can be fed in parallel to the heat exchangers, which are interposed between successive compression stages. The heat-storage water is stored in an insulated vessel, also made from plastic that is attached to an anchored slip or is floating at the surface.

Storage of the compressed air proceeds with no mass loss; on the other hand, the heat-storage medium loses heat to the surroundings, influenced by the surface/volume ratio and the effectiveness of the insulation. The lost energy can be replaced by burners, waste heat from local power plants, or solar energy. Because the maximum temperature of the heat storage tank is relatively low, heat pumps are also suitable for replacing heat losses. A heat pump extracts heat of vaporization from the ocean water. During the discharge phase, the electric energy stored overnight is retrieved by feeding the compressed air through a turbine, in the direction opposite to flow during compression. Before entering each turbine stage, the expanding air stream is heated to restore the thermal energy that was extracted during compression. The same turbine also transforms any extra heat added to the compressed air into mechanical energy. This energy transformation occurs near maximum efficiency because of the extremely high compression ratio. If sufficient heat is added, the energy delivered by the storage system can exceed the original amount of stored electric energy.

Of special interest is the application of the invention in the wind energy field. A large number of smaller wind machines with the same swept area as one large wind machine produces more cost effective power than large wind machines. This makes a system necessary to convey the energy, gained by a number of small wind machines to the generator of the storage plant. Therefore the invention proposes closed circuits of water, accelerated by the wind machines to drive one large water turbine, which is coupled with the generator.

The following Figures describe the invention:

Figure 1:
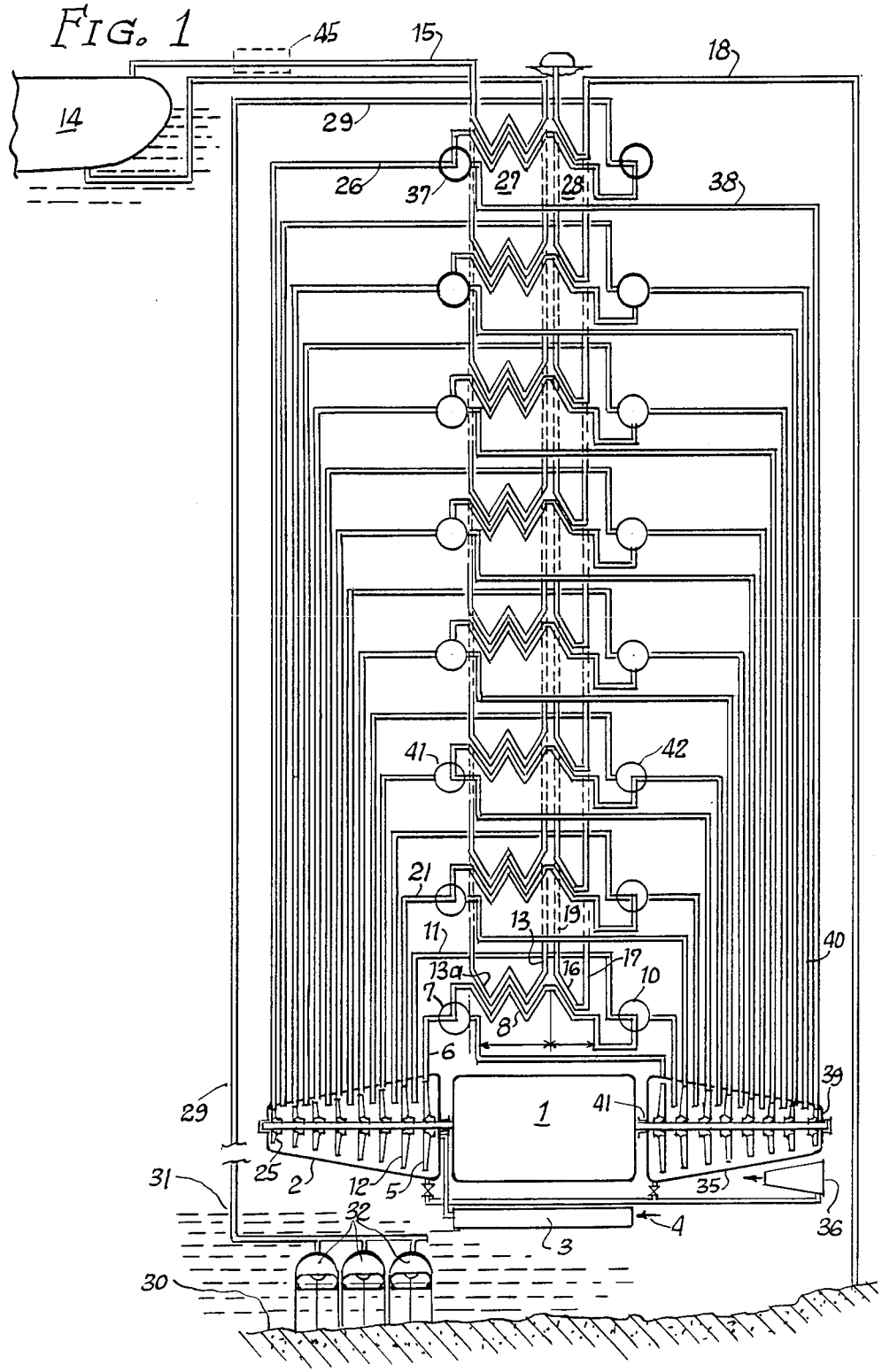
FIG. 1 shows a schematic diagram of the system.

FIG. 1 is a schematic diagram of the system. While energy is being stored during charging, the electric generator motor (1) operates the compressor (2), which applies suction on the incoming ambient air (4). The incoming air drawn through the air filter (3), which also cools the air. In the first stage (5), the air is compressed such that the outlet air in pipe (6) shows a temperature increase less than 90° K. This air flows through 3-way-valve (7) to heat exchanger (8) and then to heat exchanger (9). It continues through 3-way-valve (10) and pipe (11) to the suction region of the second stage (12). The heat storage medium, fresh water, is pumped through pipe (13) out of the bottom part of the heat storage tank (14). From the heat exchanger, the heated water flows back to the top part of the heat storage tank (14) through pipe (15). Additional cooling occurs in heat-exchanger section (9, 16), the deep-sea water is heated and returned through pipe (19) to the ocean. In heat-exchanger section (9, 16), the temperature rises from about 4° C. to 20° C. So during charging the ocean serves as heat sink (and consequently as heat source during the energy release mode). In the second state (12), the air is further compressed and cooled again. The second stage applies the same compression ratio as the first stage so that the exiting air in pipe (21) reaches the same temperature as the air stream in pipe (6) from the first stage (5).

After the compressed air is brought up to maximum pressure in the final stage (25), it is fed in pipe (26) into the last heat-exchange stage (27, 28). From there, the cold, highly compressed air flows in pipe (29) nearly to the ocean bottom (30) and then through the manifold pipe (31) into the air storage vessels (32).

During peak electrical use operation, the motor-generator (1) operates as a generator. The compressed-air turbine (35), which previously was evacuated, drives the generator. At this time, the compressor (2) is evacuated to avoid gas friction losses. All 3-way valves (7, 10) are shifted from the position shown in (7) and (10) to the position shown in (41) and (42). The compressed air from the storage vessels (32) that comes up through the pipes (31, 29) passes through the heat exchanger (27, 28) in the direction opposite to that of the charging mode. It flows through 3-way valve (37) into pipe (38) and into the inlet region of the first turbine stage (39).

Theoretically, the air stream in the heat exchanger rises to the same temperature that it had after the corresponding stage of compression. Because of the pressure drop in the turbine stage (39), the compressed air enters pipe (40) with a temperature which corresponds to the inlet temperature of the air entering the second compressor stage through pipe (11). Therefore, this temperature is again about 4° C. In each successive stage, the energy which was removed during the charging is returned to the compressed-air stream. Cold air, see arrow (43), leaves the turbine at the point where all of the stored energy of the heat storage tank (14) has been consumed. The heat source (45) permits heat which was lost through the walls of storage tank (14) to be injected into the cycle. This can be accomplished by any source of heat, preferably by heat pumps extracting heat from the sea. By further additions of heat, the heat transfer losses and the aeordynamic losses can be fully compensated by extra heat infusion. It is even possible to deliver more electricity than was originally consumed by the compressor motor (1).

Figure 2:
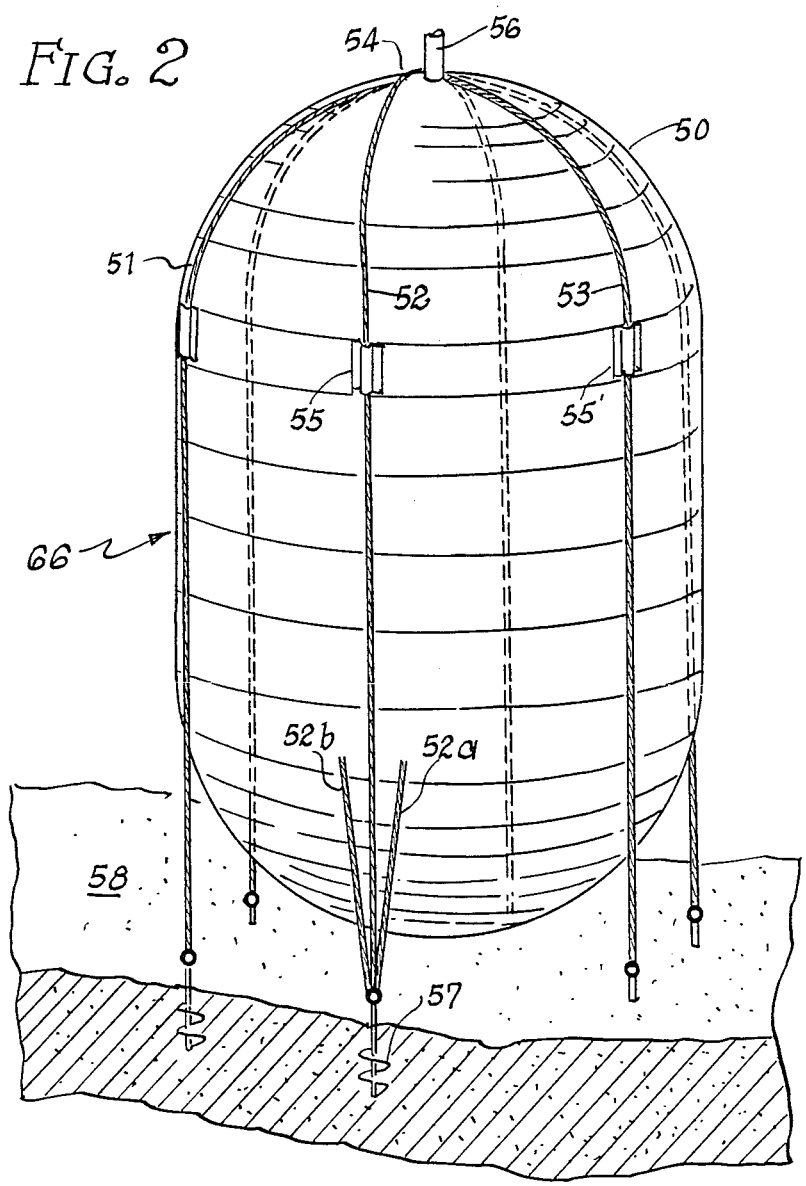
FIG. 2 shows a storage balloon of the invention.

FIG. 2 shows a compressed air storage vessel (66). The balloon skin (50) consists of a plastic foil reinforced by mineral fiber. The thickness of the balloon skin decreases from top to bottom. The balloon is located inside a cage formed by three cables (51, 52, 53) in an upside-down U shape. The cables are joined at the zenith (54) of the balloon and fixed to the balloon by loops (55). The compressed air flows in and out of the balloon through tube (56). The cables are fixed to the sea bottom by anchors (57). Each anchor holds cables from three adjacent balloons.

Figure 3A:
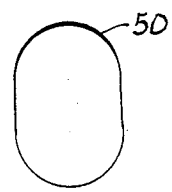
FIGS. 3a–3d shows a balloon at four points during the discharge mode of the operation of the invention.

FIG. 3a shows the cross-section of a completely filled balloon.

Figure 3B:
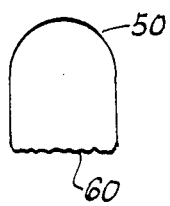

FIG. 3b shows a balloon skin (50) about 50% filled. The bottom of the skin (60) is supported by a plane of water whose hydrostatic pressure is compensated by the inside air pressure.

Figure 3C:
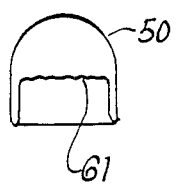

FIG. 3c shows the cross-section of a 30%-filled balloon (66). During the emptying process, the bottom part of the cylindrical region rises upward towards the top of the balloon, while the lower edge of the cylindrical part turns inward like a rolling membrane.

Figure 3D:
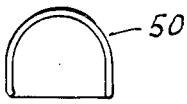

FIG. 3d shows the cross-section of a completely empty balloon.

Figure 4:
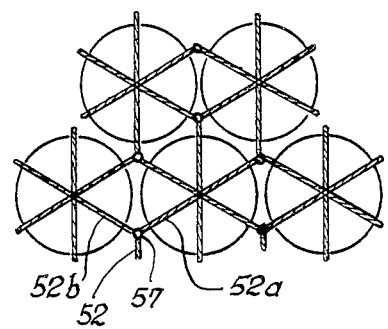
FIG. 4 shows the top view of a matrix of storage balloons.

FIG. 4 shows the top view of a matrix of storage balloons anchored at the ocean bottom. Each anchor (57) fastens three cables (52, 52a, 52b). Therefore, the load on each anchor is 50% of the buoyant lift of a balloon.

Figure 5:
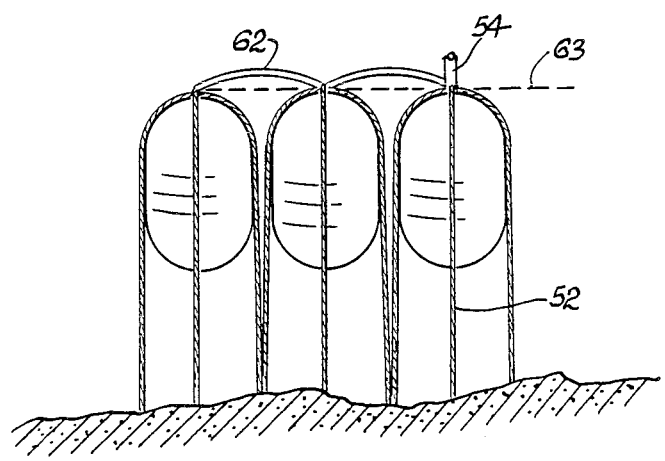
FIG. 5 shows a vertical cross section of the matrix of FIG. 4.

FIG. 5 shows the vertical cross-section of the matrix with the manifold tubes (62) through which the air flows in and out of the balloons. It also shows the cables whose lengths are varied such that all balloons are located in the same horizontal plane (63).

Figure 6:
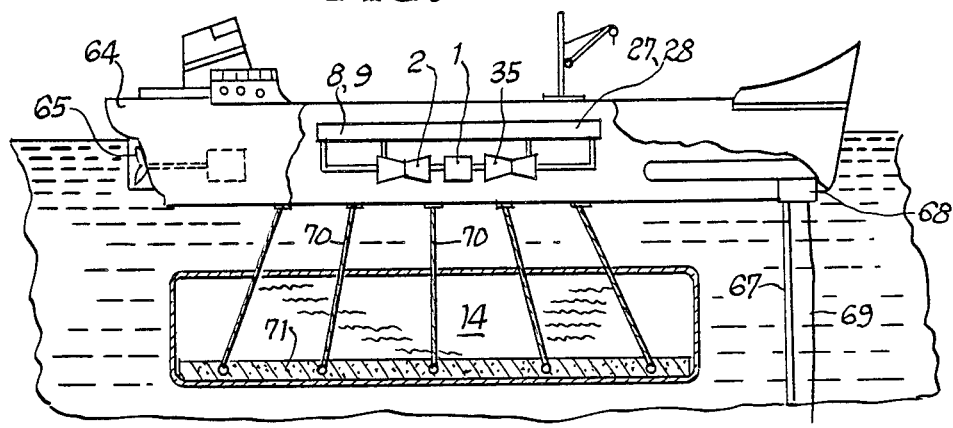
FIG. 6 shows the components of the energy storage system of the invention.
Figure 6:
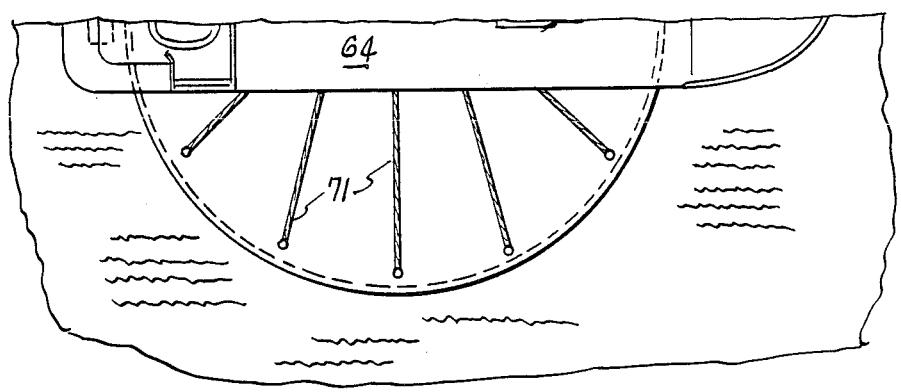
Figure 6:
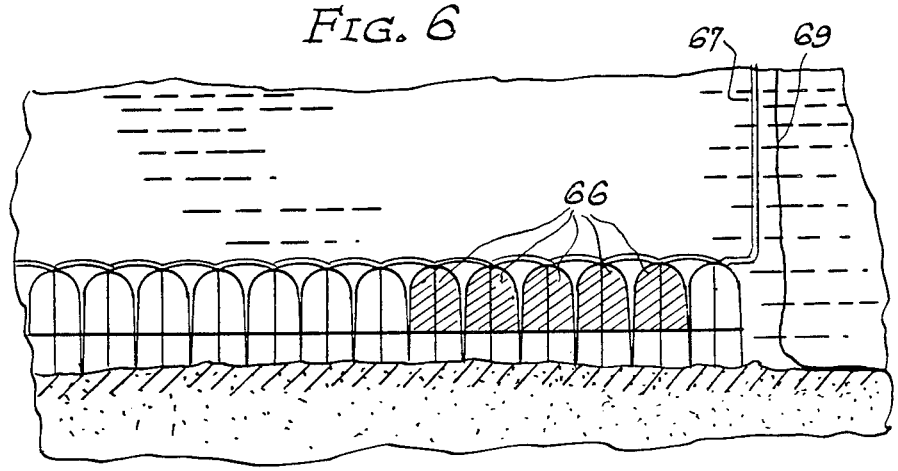

FIG. 6 shows the components of the energy storage system. The generator (1), compressor (2) and turbine (35) are all installed in the ship (64), together with the heat exchangers (8, 9–27, 28). By anchor cables (not shown) or by turning of the ship's crew (65), the ship maintains its position above the field of storage balloons (66). Air flow (4) to and from the storage balloons (66) is accomplished by a high pressure line (67) going through a rotary turret (68), which is mounted to the hull of the ship. The same rotary turret carries the high voltage cable (69) which lies on the ocean bottom and connects the ship with the land-based power grid. The heat storage tank (14) is held in position by means of cables (70) connected to the hull of the ship. Inside the heat storage tank, there is a concrete slab (71) that compensates the buoyant lift of the warm fresh water.

Figure 7:
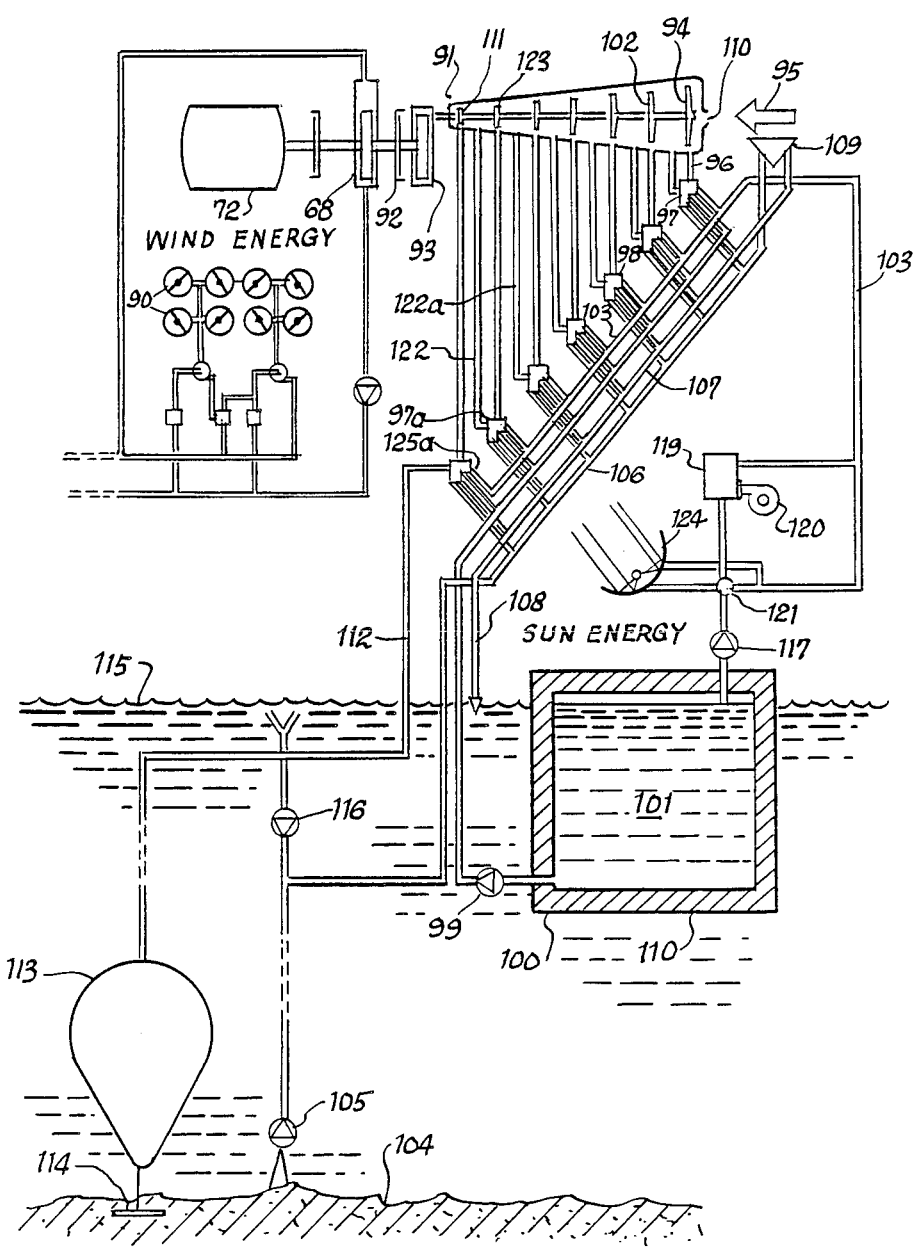
FIG. 7 shows a schematic diagram of an energy storage for storing wind energy.

In FIG. 7 the wind machines (90) drive the pelton turbine (73), producing electricity by the generator (72).

If available performance of the wind machines (90) exceeds the actual energy demand, the compressor-expander machine (91) will be driven via the clutch assembly (92) and the gear box (93). The first stage (94) of this machine (91) sucks an air stream (95) and supplies compressed air through the pipe (96) into the heat exchanger (97). The heat exchanging wall extracts compression heat of the compressed air by a storage water circuit circulated by the pump. (99). This water circuit communicates with a floating heat-storage container (100) filled with fresh water (101). The compression enthalpy of each of the compressor stages (94, 102–111) causes an increase of air temperature of 74° K. The heated water is brought back into the hot water storage (101) by the pipe (103). A second circuit of heat carrier water starts at the sea bottom (104) where the pump (105) provides water at deep sea temperature (that is 4° C.) to the pipe (106). Also this heat carrier circuit is connected with each of the heat exchangers (97, 98 and so on). The deep sea water cools the air of each stage further down and leaves, warmed up through the pipe (107) the system flowing back through the pipe (108) to the sea. The same 4° C. water circuit passes through the heat exchanger (109), that cools the entering air symbolized by arrow (95), entering the compressor inlet (110).

By this means, the sea forms the second energy storage for the low temperature side of the process. By this process the total compression enthalpy can be extracted and stored in the storage (100) or partly in the open sea. In the last stage (111) of the compressor, the pressure of the air is brought up to a static pressure equivalent with the pressure near the bottom of the sea (104). Through pipe (112) the highly compressed air, cooled down to about 4° C. is conducted to the air storage (113), which consists of a multiple of balloon shaped plastic film containers which are anchored by anchors (114) or contain ballast by partly filling with sand.

If the demand of the grid can not be fulfilled by the wind turbine performance, the whole process of the storage plant will be reversed. The compressed air, having a temperature of 4° C. gets heated up by warm water taken from the sea surface (115) which is pumped through the pump (116) into the pipe (106) leaving the system through the pipe (108), whereby the compressed air with a temperature of close to 4° C. is warmed up in the heat exchanger (125) close to the surface water temperature of the sea. The pump (117) provides hot water through the pipe (103) to the heat exchanger (125a) and therefore supplies via the valve (121) all heat exchangers (97, 98–125a) with hot water so that the compression enthalpy produced during compression by the stage (111) is recuperated to the compressed air in the stage (111). The temperature of the compressed air drops back to the original temperature by expansion in the turbine, the air leaves the stage (111) through pipe (122) and is heated up through heat exchanger (97a) whereby again the compression enthalpy of the next stage (123) of the turbine is fully recuperated, when the compressed air leaves after expansion in the turbine through the pipe (122a) to the next heat exchanger and so on. By this method, the full amount of stored energy is available during energy discharge, if efficiency is not considered.

The compressed air container (113) has no losses of air, while the thermal energy storage (100) has some losses depending on the insulation properties of the wall (118). Therefore from time to time, heat has to be added. For this purpose, a boiler (119) with a burner (120) can replace the lost heat to the hot water circuit. Instead of this boiler (119), a solar collector (124) can provide sun energy to replace the losses. Both heat sources (119 and 124) can also be used to add heat in excess of the recuperated compression heat and the energy losses. In this case the storage plant provides more mechanical or electrical energy than generated by the wind turbines during the charging phase.

The combination of wind power and solar energy is advantageous for many places in the world.

What is claimed:

1. A storage vessel for gaseous fluids submerged into a body of water resting over a floor, said vessel having a vertically aligned cylindrical wall portion, a circular cross-section in a horizontal plane and two end portions;

the specific density of the storage vessel being different from that of the water body;

ropes connected to the end portions of the cylinder;

said ropes being uniformly distributed over the circumference of the vessel, surrounding said vessel's cylindrical wall portion and transmitting the forces caused by the difference in density to a system with an invariable geodetical level formed by the surface of the floor;

wherein the shape of the storage vessel is defined by a geometric body of rotation and a semispherical upper end portion above the cylindrical wall portion;

the skin of the storage vessel is made of plastic foil, said ropes are attached to its upper end portion and run downwardly; and the lower part of the cylindrical wall portion turns inward like a rolling membrane and rises toward the upper end portion of the storage vessel as the mass of fluid in the storage vessel decreases.

2. A storage vessel for gaseous fluids according to claim 1, wherein said vessel forms a matrix with other such storage vessels in which each storage vessel is held by six ropes fixed to six anchors in the floor, whereby three ropes belonging to three adjacent storage vessels are held by the same anchor.

* * * * *